(12) United States Patent
Park (10) Patent No.: US 9,769,177 B2
(45) Date of Patent: Sep. 19, 2017

(54) ROLE-BASED ACCESS CONTROL TO COMPUTING RESOURCES IN AN INTER-ORGANIZATIONAL COMMUNITY

(75) Inventor: Joon S. Park, Jamesville, NY (US)

(73) Assignee: Syracuse University, Syracuse, NY (US)

(*) Notice: Subject to any disclaimer, the term of this patent is extended or adjusted under 35 U.S.C. 154(b) by 863 days.

(21) Appl. No.: 12/137,077

(22) Filed: Jun. 11, 2008

(65) Prior Publication Data

US 2008/0313716 A1     Dec. 18, 2008

Related U.S. Application Data

(60) Provisional application No. 60/934,256, filed on Jun. 12, 2007.

(51) Int. Cl.
| | | |
|---|---|---|
| *G06F 21/00* | (2013.01) | |
| *H04L 29/06* | (2006.01) | |
| *G06F 21/60* | (2013.01) | |

(52) U.S. Cl.
CPC .......... *H04L 63/104* (2013.01); *G06F 21/604* (2013.01); *H04L 63/126* (2013.01)

(58) Field of Classification Search
CPC ............................ G06F 21/6218; G06F 21/604
USPC ....................................................... 726/2–10
See application file for complete search history.

(56) References Cited

U.S. PATENT DOCUMENTS

| | | | | |
|---|---|---|---|---|
| 5,805,803 A | * | 9/1998 | Birrell et al. .................... 726/12 |
| 5,815,574 A | * | 9/1998 | Fortinsky ............ G06F 21/6218 713/153 |
| 6,311,269 B2 | * | 10/2001 | Luckenbaugh et al. ...... 713/154 |
| 6,339,423 B1 | * | 1/2002 | Sampson ........... G05B 19/0425 709/219 |
| 6,389,540 B1 | | 5/2002 | Scheifler et al. |
| 6,453,353 B1 | * | 9/2002 | Win et al. ..................... 709/229 |
| 6,732,179 B1 | | 5/2004 | Brown et al. |
| 6,883,100 B1 | * | 4/2005 | Elley ..................... G06F 21/629 726/5 |
| 6,934,758 B2 | | 8/2005 | Scheifler et al. |
| 6,938,021 B2 | | 8/2005 | Shear et al. |
| 6,965,751 B2 | * | 11/2005 | Koga et al. ................... 434/350 |
| 7,010,600 B1 | * | 3/2006 | Prasad ................. H04L 63/102 709/223 |
| 7,076,558 B1 | | 7/2006 | Dunn |

(Continued)

OTHER PUBLICATIONS

Park (Park et al., "Trusted P2P computing environments with role-based access control", IET Inf. Secur., Vo.. 1, No. 1, Mar. 2007).*

(Continued)

*Primary Examiner* — Ali Shayanfar
(74) *Attorney, Agent, or Firm* — Heslin Rothenberg Farley & Mesiti P.C.

(57) ABSTRACT

A method for controlling access to a plurality of computing resources in a distributed computing environment can comprise the steps of: an application role server, responsive to receiving a certificate request, authenticating the requester and issuing a digital certificate to the requester; an access control node, responsive to receiving a resource access request, granting access to the computing resource to the requester upon ascertaining the requestor's access privileges, or forwarding the resource access request to another access control node.

25 Claims, 7 Drawing Sheets

(56) References Cited

U.S. PATENT DOCUMENTS

| | | | |
|---|---|---|---|
| 7,131,000 B2 | 10/2006 | Bradee | |
| 7,133,846 B1 | 11/2006 | Ginter et al. | |
| 7,143,066 B2 | 11/2006 | Shear et al. | |
| 7,165,174 B1 | 1/2007 | Ginter et al. | |
| 7,194,764 B2* | 3/2007 | Martherus et al. | 726/8 |
| 7,205,882 B2 | 4/2007 | Libin | |
| 7,272,815 B1 | 9/2007 | Eldridge et al. | |
| 7,284,271 B2 | 10/2007 | Lucovsky et al. | |
| 7,337,315 B2 | 2/2008 | Micali | |
| 7,353,396 B2 | 4/2008 | Micali et al. | |
| 7,379,945 B1 | 5/2008 | Hirsch et al. | |
| 7,404,203 B2 | 7/2008 | Ng | |
| 7,415,617 B2 | 8/2008 | Ginter et al. | |
| 7,472,277 B2* | 12/2008 | Halcrow et al. | 713/175 |
| 7,657,531 B2* | 2/2010 | Bisbee et al. | 713/182 |
| 7,870,255 B2* | 1/2011 | Shenfield et al. | 709/225 |
| 7,953,979 B2* | 5/2011 | Borneman | G06F 21/41 |
| | | | 713/156 |
| 7,992,194 B2* | 8/2011 | Damodaran | H04L 9/0643 |
| | | | 380/278 |
| 8,042,162 B2* | 10/2011 | Blakley et al. | 726/8 |
| 8,051,491 B1* | 11/2011 | Cavage | G06F 21/6218 |
| | | | 707/609 |
| 8,171,524 B2* | 5/2012 | Micali et al. | 726/2 |
| 8,250,045 B2* | 8/2012 | Er | G06F 21/629 |
| | | | 707/702 |
| 8,286,229 B2* | 10/2012 | Bodin et al. | 726/10 |
| 8,336,078 B2* | 12/2012 | Dixit et al. | 726/1 |
| 8,365,257 B1* | 1/2013 | Causey et al. | 726/5 |
| 8,418,238 B2* | 4/2013 | Platt et al. | 726/8 |
| 8,452,873 B2* | 5/2013 | Chen et al. | 709/226 |
| 8,510,818 B2* | 8/2013 | Garg et al. | 726/9 |
| 8,732,457 B2* | 5/2014 | Micali | 713/156 |
| 8,972,740 B2* | 3/2015 | Garrity et al. | 713/182 |
| 2002/0004900 A1* | 1/2002 | Patel | 713/155 |
| 2002/0026592 A1 | 2/2002 | Gavrila et al. | |
| 2002/0156904 A1* | 10/2002 | Gullotta et al. | 709/229 |
| 2002/0166049 A1* | 11/2002 | Sinn | G06F 21/33 |
| | | | 713/175 |
| 2003/0120610 A1* | 6/2003 | Hamber | G06Q 20/3674 |
| | | | 705/67 |
| 2003/0154403 A1 | 8/2003 | Keinsley et al. | |
| 2004/0025048 A1 | 2/2004 | Porcari et al. | |
| 2004/0186836 A1 | 9/2004 | Schlesinger | |
| 2004/0225893 A1 | 11/2004 | Ng | |
| 2004/0225896 A1 | 11/2004 | Ng | |
| 2005/0149724 A1* | 7/2005 | Graff | H04W 12/06 |
| | | | 713/156 |
| 2005/0216766 A1 | 9/2005 | Cornpropst et al. | |
| 2005/0251852 A1 | 11/2005 | Patrick et al. | |
| 2006/0010483 A1 | 1/2006 | Buehler et al. | |
| 2006/0048224 A1 | 3/2006 | Duncan et al. | |
| 2006/0064313 A1 | 3/2006 | Steinbarth et al. | |
| 2006/0080440 A1 | 4/2006 | Vasandani et al. | |
| 2006/0117390 A1 | 6/2006 | Shrivastava et al. | |
| 2006/0136425 A1* | 6/2006 | Baek | G06F 9/50 |
| 2007/0006322 A1* | 1/2007 | Karimzadeh | G06F 19/323 |
| | | | 726/27 |
| 2007/0107048 A1* | 5/2007 | Halls et al. | 726/4 |
| 2007/0171921 A1* | 7/2007 | Wookey | G06F 3/1415 |
| | | | 370/401 |
| 2007/0214497 A1 | 9/2007 | Montgomery et al. | |
| 2007/0283143 A1* | 12/2007 | Yami | H04L 63/0823 |
| | | | 713/156 |
| 2008/0034402 A1 | 2/2008 | Botz et al. | |
| 2008/0162930 A1 | 7/2008 | Finney et al. | |
| 2008/0168063 A1 | 7/2008 | Whitson | |
| 2008/0173709 A1* | 7/2008 | Ghosh | G06F 21/34 |
| | | | 235/382 |
| 2010/0217987 A1* | 8/2010 | Shevade | G06F 21/6272 |
| | | | 713/175 |

OTHER PUBLICATIONS

Park, Joon S.; Sandhu, Ravi; Ahn, Gail-Joon; "Role Based Access Control on the Web" University of North Carolina at Charlotte, ACM Transactions on Information and System Security, vol. 4, Feb. 2001, pp. 37-71.(35 pages).

International Search Report for International Patent Application No. PCT/US08/66694. Dated Sep. 10, 2008. 2 pages.

Written Opinion of the International Searching Authority for International Patent Application No. PCT/US08/66694. Dated Sep. 10, 2008. 4 pages.

Apr. 26, 2012 Australian Office Action in Australian Application No. 2008261628.

\* cited by examiner

Fig. 1

210 Resource Description Table

| Resource ID | Attribute name | Attribute value |
|---|---|---|
| R12345 | Location | 10.0.0.1/index.asp |
| R12345 | Type | ASP |
| | | |
| | | |
| | | |
| | | |
| | | |

220 Permission Role Assignment Table

| Resource ID | Role | Permission | Service level |
|---|---|---|---|
| A01234 | Manager | Read/write | 8 |
| A01234 | Operator | Read/write | 10 |
| A01234 | Public | Read only | 2 |
| | | | |
| | | | |
| | | | |
| | | | |

ROLE-BASED ACCESS CONTROL TO COMPUTING RESOURCES IN AN INTER-ORGANIZATIONAL COMMUNITY

CROSS-REFERENCE TO RELATED APPLICATIONS

This application claims priority under 35 U.S.C. §119(e) of the following provisional application: U.S. Ser. No. 60/934,256, filed Jun. 12, 2007, entitled "ROLE-BASED ACCESS CONTROL TO COMPUTING RESOURCES IN AN INTER-ORGANIZATIONAL COMMUNITY", the content of which is incorporated herein by reference.

FIELD OF THE INVENTION

This invention relates generally to controlling access to computing resources in a distributed environment, and more specifically to providing role-based access control to computing resources in a resource sharing community encompassing several organizations.

BACKGROUND OF THE INVENTION

In distributed computing environments, often there is a need to share computing resources (e.g., files or software applications). One of the most popular examples of a distributed environment with resource sharing is a peer-to-peer (P2P) file sharing community. In a P2P environment, there is no concept of a dedicated centralized server to provide clients with requested resources. Instead, every peer or participant in the system acts as both client and as server, depending upon the context. Users can share heterogeneous resources residing in various platforms and in different policy environments. A P2P-based resource management model can provide higher resource availability due to the distributed nature of P2P computing. In a generalization of the P2P model, resource providers and resource consumers can belong to a multitude of organizations, and each resource provider can define the access policy and service levels for the resources provided, while each service requestor can select the resources based on the access policy and service level.

However, the lack of effective and scalable access control mechanisms has become a serious constraint for broader applications of resource sharing technologies in distributed environments. Considering the dynamism of a large-scale distributed environment, where users and resource providers from different organizations can join and leave the resource sharing communities frequently, the conventional identity-based access control is severely undermined by its inability to scale with the growth of the population of the resource sharing community. Therefore, there is a need to provide an effective and scalable access control mechanism for resource sharing communities encompassing multiple organizations.

SUMMARY OF THE INVENTION

A method for controlling access to a plurality of computing resources in a distributed computing environment can comprise the steps of: an application role server responsive to receiving a certificate request, authenticating the requester and issuing a digital certificate to the requester; an access control node responsive to receiving a resource access request, granting access to the computing resource to the requester upon ascertaining the requestor's access privileges, or forwarding the resource access request to another access control node.

BRIEF DESCRIPTION OF THE DRAWINGS

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
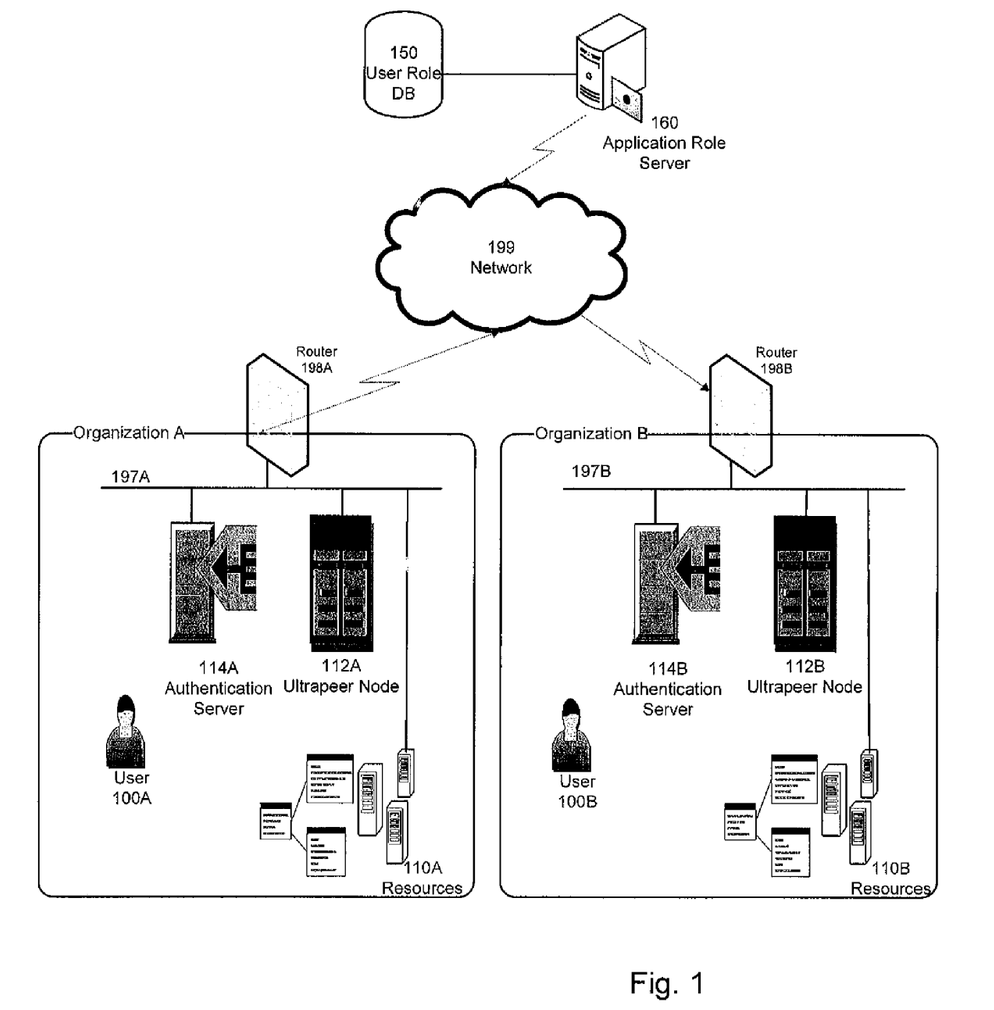
FIG. 1 illustrates the organizational level view of a resource sharing community encompassing multiple organizations.

FIG. 1 illustrates the organizational level view of a resource sharing community encompassing multiple organizations. The resource sharing community depicted in FIG. 1 can encompass several organizations, including Organization A and Organization B. The connectivity within an organization can be over at least one network, depicted in FIG. 1 as networks 197A, 197B. A network can include zero or more local area networks (LAN), zero or more wide area networks (WAN), zero or more virtual private networks (VPN), together with any packet switching and routing equipment necessary to establish the inter-network connectivity.

Networks of the organizations members of the community can be interconnected via a network 199. Network 199 can include zero or more LANs, zero or more WANs, zero or more VPNs, together with any packet switching and routing equipment necessary to establish the inter-network connectivity. Networks 197A-197B and network 199 can be interconnected, e.g., via routers 198A-198B. In one embodiment, network 199 can be the Internet, and networks 197A-197B can be organizational intranets.

Users 100A-100B of each organization may wish to access computing resources 110A-110B of their own organization or of another organization member of the inter-organizational community. Computing resources 110 can include files (e.g., video content files), network-accessible storage (e.g., disk arrays attached to storage area networks), web services, and software applications. Each organization can have an authentication server 114 storing the list of users belonging to the organization. For each user, at least a unique user identifier (user ID) and authentication information can be stored. Authentication server 114A can employ a well known strong authentication mechanism such as X.509 certificate, Kerberos, or password-based authentication. Authentication server 114 can be implemented, e.g., as a Lightweight Directory Access Protocol (LDAP) server.

Each resource can have a set of permissions associated with it. In accordance with the role-based access control (RBAC) approach, permissions to access one or more resources can be associated with one or more roles, and one or more users can be assigned to one or more roles, thereby acquiring the roles' permissions. Thus, a role is a collection of users and the associated set of permissions. In one embodiment, the assignment of users to roles can be stored in the centralized user role assignment database (URA DB) 150. In another embodiment, the assignment of users to roles can be decentralized and stored by organizational authentication servers 114.

Each organization that owns computing resources shareable among the users of the multi-organizational community can have at least one ultrapeer node 112. Ultrapeer node 112 can manage the access to shareable computing resources by maintaining the list of the resources, including the authorization information for each of the resources. The authorization information for every resource can be stored in the form of Permission Role Assignment Table.

One or more service levels can be associated with a computing resource (e.g., the resource availability). Service level can be the same for all the users, or can be based on the requesting user's role (e.g., service level can indicate the priority level for servicing the requests from users assigned to a particular role). The service level corresponding to a particular role for a given resource can also be stored in the Permission Role Assignment Table.

In order to establish the access permitted and/or the service level to a given resource for a particular user requesting the resource, the entity controlling access to the resource (e.g., ultrapeer node 112 of FIG. 1) can select from the Permission Role Assignment Table the highest permission and/or the highest service level among the permissions and service levels corresponding to the roles to which the user is assigned.

Figure 3:
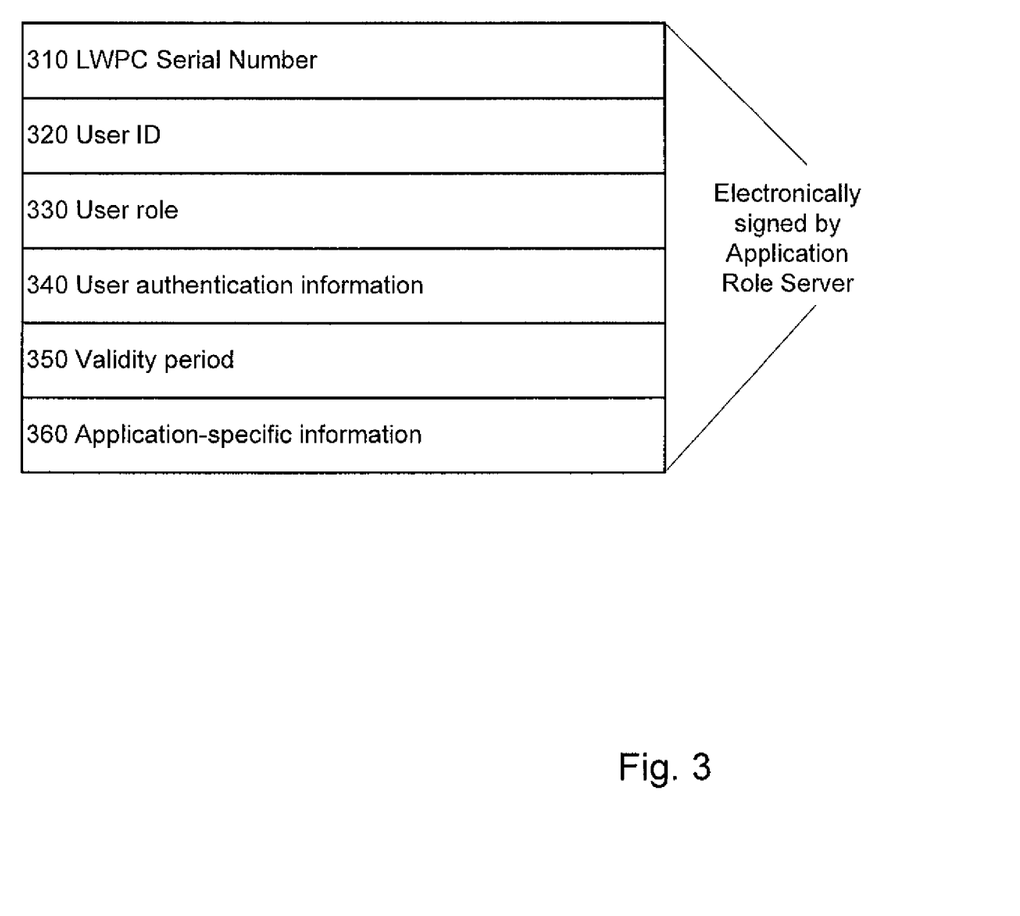
FIG. 3 illustrates the lightweight peer certificate (LWPC) structure.

Application role server (ARS) 160 can act as a central authoritative source of user identity and role assignment information. Application role server 160 can issue to users lightweight peer certificates (LWPC). An LWPC contains user identity and user role assignment information, and is electronically signed by the issuer (application role server 160). The LWPC structure is shown in FIG. 3. Thus, a user can provide his or her LWPC to any entity within the inter-organizational community as the proof of the user's identity and role assignment.

Figure 2:
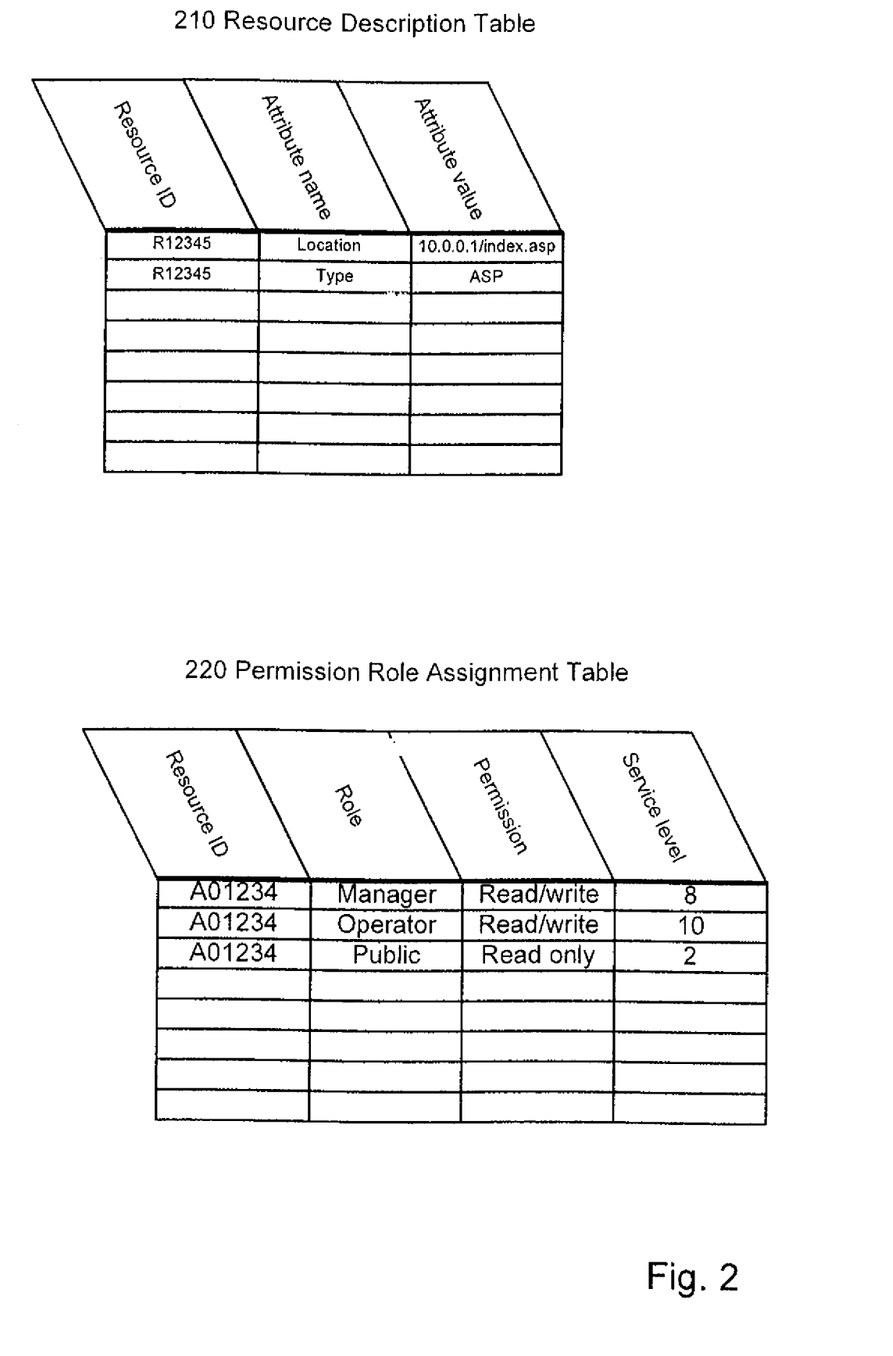
FIG. 2 illustrates the exemplary embodiments of Resource Description Table structure and Permission Role Assignment Table structure.

FIG. 2 illustrates the exemplary embodiments of Resource Description Table structure and Permission Role Assignment Table structure.

Resource Description Table 210 can contain a plurality of resource description records, each of those records including resource ID, attribute name, and attribute value. One or more resource description records can be associated with a given computing resource. Resource description attributes can include attributes applicable to all resource types, e.g., resource location. Resource description attributes can also include type-specific attributes, e.g., version (for a software application).

Permission Role Assignment Table 220 can contain a plurality of permission role assignment records, each of those records including the following fields: resource identifier, role, access permitted to the users assigned to the role, and the service level provided to the users assigned to the role.

A resource identifier can be specified as a unique alphanumeric string of a fixed or variable size used to identify one or more computing resources within the organization. A resource identifier can be, e.g., a file name to identify a file, or a universal resource locator (URL) to identify a software application.

A role can be specified as an alphanumeric string of a fixed or variable size used to identify a role assignable to users of the inter-organizational community.

A permission can be specified as a combination of one or more of the following access types: read (a file or a URL), write (to a file or to a URL), execute (a file), etc. Other access types can be defined depending upon the types of computing resources existing within the resource sharing community. Not all the types of access may be applicable to every type of computing resource.

A service level can be specified, e.g., as a priority level for servicing the requests from users assigned to a particular role, or as an average resource response time.

FIG. 3 illustrates the LWPC structure. LWPC can include the following fields: certificate serial number 310, user ID 320, list of user roles 330, user authentication information 340, the certificate validity period 350, and the application-specific information 360. The LWPC structure can be electronically signed by the issuer such as application role server 160 of FIG. 1.

Certificate serial number 310 can be a unique alphanumeric string of a fixed or variable size. Certificate serial number can be used for tracking the certificate issuance and usage.

User ID 320 can be a unique alphanumeric string of a fixed or variable size used to uniquely identify a user of the inter-organizational community. A user ID can include a prefix or a suffix identifying the organization to which the user belongs. A user's e-mail address can be used as the user ID.

The list of user roles 330 can include the alphanumeric strings representing the names of the roles to which the user is assigned.

In one embodiment, the user's authentication information 340 can be provided as the user's password in a hashed form. In another embodiment, the user's authentication information 340 can be provided as the user's password in an encrypted form. While using encrypted passwords can be cryptographically more secure than using hashed passwords, it can require sharing the encryption keys between the entity issuing an LWPC (e.g., application role server 160 of FIG. 1) and the entity to which the user presents the LWPC (e.g., ultrapeer nodes 112A-112B of FIG. 1), which can hinder the scalability with the growth of number of the organizations within the resource sharing community.

The certificate validity period 350 can be an alphanumeric string representing the date and time of the LWPC expiration. An LWPC can be issued with a relatively short life time (e.g., several minutes), thus eliminating the need to maintain a certificate revocation list (CRL) in order to accommodate the possibility of a user changing the role assignment. Furthermore, a short LWPC lifetime minimizes the possibility of an intruder successfully applying a brute force attack to reconstruct the hashed user password.

An LWPC can be electronically signed by the private key of application role server 160 of FIG. 1, to prevent any tampering with the LWPC content. An entity wishing to use the LWPC can decrypt it using the public key of application role server 160 of FIG. 1.

Figure 4:
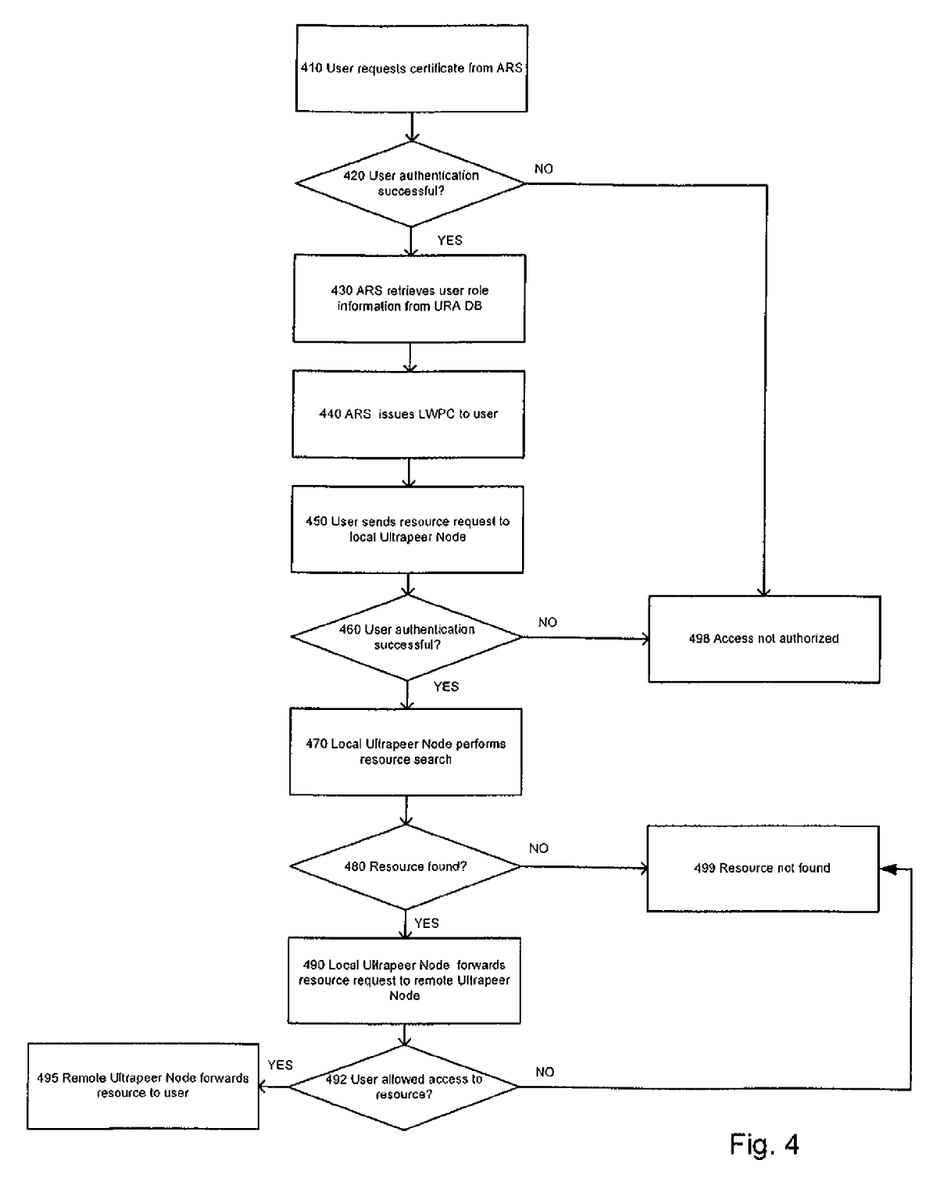
FIG. 4 illustrates a flow diagram of a sample implementation of the method of role-based access control in a multi-organizational resource sharing community.

FIG. 4 illustrates a flow diagram of a sample implementation of the method of role-based access control in a multi-organizational resource sharing community.

At step 410, user 100A of FIG. 1 belonging to Organization A of FIG. 1 and wishing to access a resource 110B, logs in to the inter-organizational community by providing the user ID and password and requesting a LWPC from application role server 160 of FIG. 1. A skilled artisan would appreciate the fact that other (not based on a user ID and password pair) authentication schemes can be used for the user authentication.

At step 420, the application role server 160 attempts to authenticate the user against the authentication server 114A of FIG. 1 of the user's organization. If the user authentication has been successful, the processing continues at step 430; otherwise, the method branches to step 499.

At step 430, application role server 160 of FIG. 1 retrieves the user's role information from user role assignment database 150 of FIG. 1.

At step 440, application role server 160 of FIG. 1 issues a LWPC to the user. The LWPC can have the structure shown in FIG. 2.

The user can be required to provide a temporary password to be used with the newly issued LWPC. In one embodiment, application role server 160 of FIG. 1 can encrypt the user supplied temporary password and include the encrypted result into the LWPC issued to the user. In another embodiment, application role server 160 of FIG. 1 can hash the user supplied temporary password and include the hashed result into the LWPC issued to the user.

At step 450, the user sends a request to access resource 110B to the ultrapeer node belonging to the user's organization (in the instant example, ultrapeer node 112A of FIG. 1 belongs to Organization A of FIG. 1). The resource access request can include the resource description or identifier, the user's valid LWPC, and the temporary password that has been used in the LWPC issuance request.

At step 460, ultrapeer node 112A of FIG. 1 verifies the validity of the presented LWPC and performs the second-level user authentication. In one embodiment, ultrapeer node can apply the hashing algorithm to the password supplied by the user as part of the resource access request, and compare the result with the password hash stored in the user's LWPC. In another embodiment, ultrapeer node can decrypt the user's password stored in the LWPC using the public key of the issuer of the certificate (e.g., application role server 160) and compare the result with the password supplied by the user as part of the resource access request. If the second-level user authentication has been successful, the processing continues at step 470; otherwise the method branches to step 499.

At step 470, ultrapeer node 112A of FIG. 1 performs the search of the resource using the resource description or identifier supplied by the user as part of the resource access request. Ultrapeer node 112A of FIG. 1 can perform the search by ascertaining whether a resource satisfying the resource access request exists among the resources controlled by ultrapeer node 112A itself, and/or by sending resource search request messages to peer ultrapeer nodes. A resource search request messages can include the resource description or identifier, and the user role information.

Each of the peer ultrapeer nodes, e.g., ultrapeer node 112B of FIG. 1, upon receiving a resource search request message, can look up the resource description or identifier in its Resource Description Table. If one or more resources satisfying the search request are located, ultrapeer node 112B of FIG. 1 can ascertain that the user's role included within the resource search request is allowed the access to each of the resources located, by looking up the Permission Role Assignment Table. Finally, ultrapeer node 112B of FIG. 1 can build a resource search response message, including the descriptions and/or identifiers of all the resources which satisfy the search request parameters, and which the user is allowed to access. The resource search response message can also include one or more of the service level, the resource usage price, and the resource access policy. Resource access policy can define one or more conditions which should be satisfied in order for the access permission to be effective. Resource access condition can be, e.g., a time period (for example, "between 9:00 AM and 5:00 PM on weekdays").

At step 480, the method ascertains whether the requested resource has been found. If yes, the processing continues at step 490; otherwise, the method branches to step 498.

At step 490, ultrapeer node 112A of FIG. 1 presents the search results to the user who can be prompted to choose a resource based on the resource description as well as one or more of the service level, the resource usage price, and the resource access policy. Upon receiving the user input indicating the user's selection of one of the resources, ultrapeer node 112A of FIG. 1 forwards the resource access request to the ultrapeer node of the organization which controls the resource, e.g., ultrapeer node 112B of FIG. 1.

At step 492, ultrapeer node 112B of FIG. 1 ascertains whether the user is allowed access to the resource, e.g., by selecting from the Permission Role Assignment Table the highest permission and/or the highest service level among the permissions and service level corresponding to the roles to which the user is assigned. If the resource access is authorized, the processing continues at step 495; otherwise, the method branches to step 499.

At step 495, ultrapeer node 112B of FIG. 1 forwards to the user the resource requested or a resource access token, and the method terminates. In one embodiment, the resource access token can be a short-living URL for the requested resource. In another embodiment, the resource access token can include a URL and an authorization token allowing the user to access the resource.

At step 498, the "Access not authorized" message is returned to the user, and the method terminates.

At step 499, the "Resource not found" message is returned to the user, and the method terminates.

Figure 5:
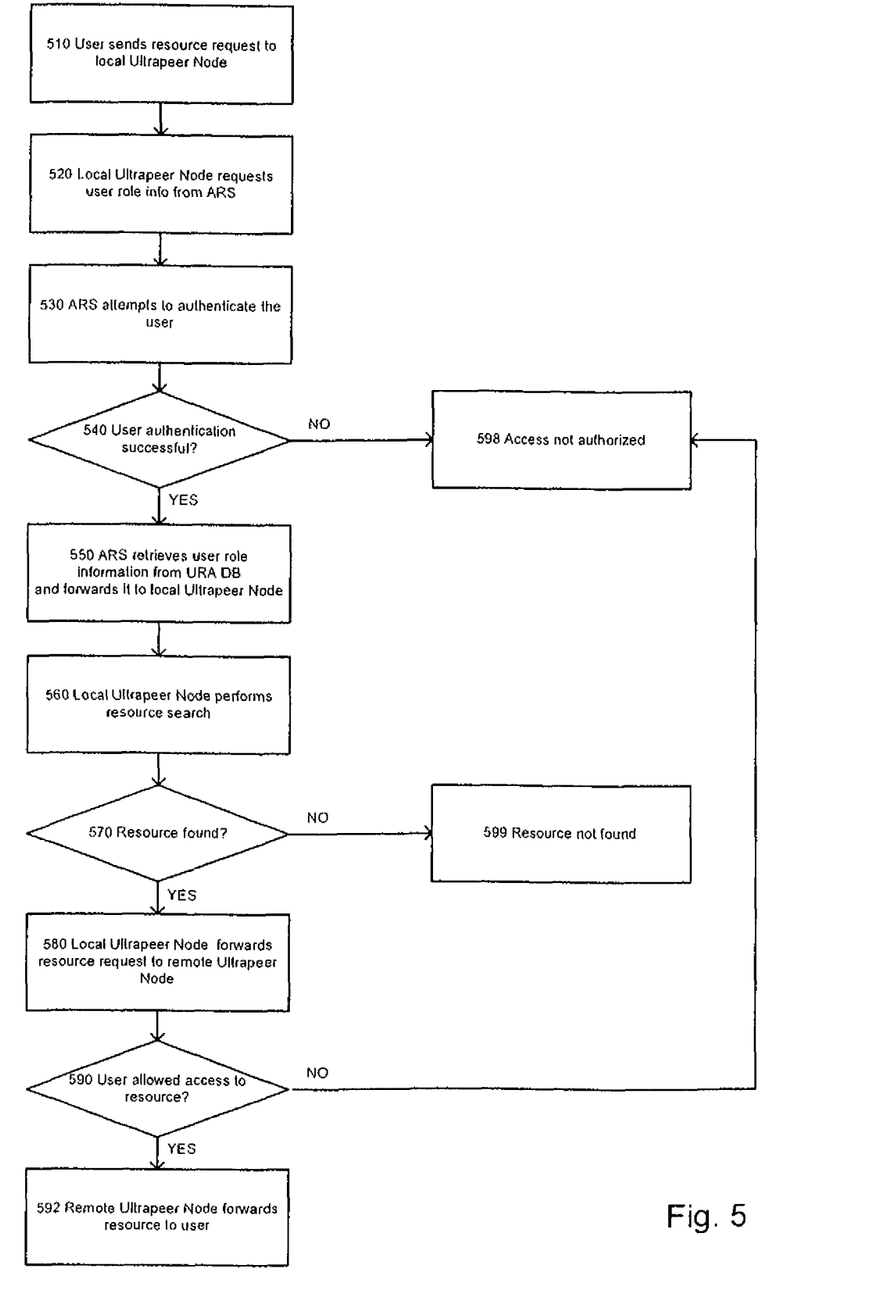
FIG. 5 illustrates a flow diagram of another sample implementation of the method of role-based access control in a multi-organizational resource sharing community.

FIG. 5 illustrates a flow diagram of another sample implementation of the method of role-based access control in a multi-organizational resource sharing community.

At step 510, user 100A of FIG. 1 belonging to Organization A of FIG. 1 and wishing to access a resource 110B, sends a request to access resource 110B to the ultrapeer node belonging to the user's organization (in the instant example, ultrapeer node 112A of FIG. 1 belongs to Organization A of FIG. 1). The resource access request can include the resource description or identifier, and the user's authentication credentials comprising a user ID and a password.

At step 520, ultrapeer node 112A of FIG. 1 requests the user role assignment from the application role server 160 of FIG. 1.

At step 530, application role server attempts to authenticate the user using the user ID supplied in the resource access request, against the authentication server 114A of FIG. 1 of the user's organization.

At step 540, the method ascertains whether the user authentication has been successful. If yes, the processing continues at step 550; otherwise, the method branches to step 599.

At step 550, application role server 160 of FIG. 1 retrieves the user's role information from user role assignment database 150 of FIG. 1 and forwards the information to ultrapeer node 112A of FIG. 1.

At step 560, ultrapeer node 112A of FIG. 1 performs the search of the resource using the resource description or identifier supplied by the user as part of the resource access request. Ultrapeer node 112A of FIG. 1 can perform the search by ascertaining whether a resource satisfying the resource access request exists among the resources controlled by ultrapeer node 112A itself, and/or by sending resource search request messages to peer ultrapeer nodes. A resource search request messages can include the resource description or identifier, and the user role information.

Each of the peer ultrapeer nodes, e.g., ultrapeer node 112B of FIG. 1, responsive to receiving a resource search request message, can look up the resource description or identifier in its Resource Description Table. If one or more resources satisfying the search request are located, ultrapeer node 112B of FIG. 1 can ascertain that the user's role included within the resource search request is allowed the access to each of the resources located, by looking up the Permission Role Assignment Table. Finally, ultrapeer node 112B of FIG. 1 can build a resource search response message, including the descriptions and/or identifiers of all the resources which satisfy the search request parameters, and which the user is allowed to access. The resource search response message can also include one or more of the service level, the resource usage price, and the resource access policy.

At step 570, the method ascertains whether the requested resource has been found. If yes, the processing continues at step 580; otherwise, the method branches to step 598.

At step 580, ultrapeer node 112A of FIG. 1 presents the search results to the user who can be prompted to choose a resource based on the resource description as well as one or more of the service level, the resource usage price, and the resource access policy. Upon receiving the user input indicating the user's selection of one of the resources, ultrapeer node 112A of FIG. 1 forwards the resource access request to the ultrapeer node of the organization which controls the resource, e.g., ultrapeer node 112B of FIG. 1. The communications between ultrapeer nodes 112 can be encrypted.

At step 590, ultrapeer node 112B of FIG. 1 ascertains whether the user is allowed access to the resource, e.g., by selecting from the Permission Role Assignment Table the highest permission and/or the highest service level among the authorization and service level corresponding to the roles to which the user is assigned. If the resource access is authorized, the processing continues at step 592; otherwise, the method branches to step 599.

At step 592, ultrapeer node 112B of FIG. 1 forwards to the user the resource requested or a resource access token, and the method terminates. In one embodiment, the resource access token can be a short-living universal resource locator (URL) for the requested resource. In another embodiment, the resource access token can include a URL and an authorization token allowing the user to access the resource.

At step 598, the "Access not authorized" message is returned to the user, and the method terminates.

At step 599, the "Resource not found" message is returned to the user, and the method terminates.

Figure 6:
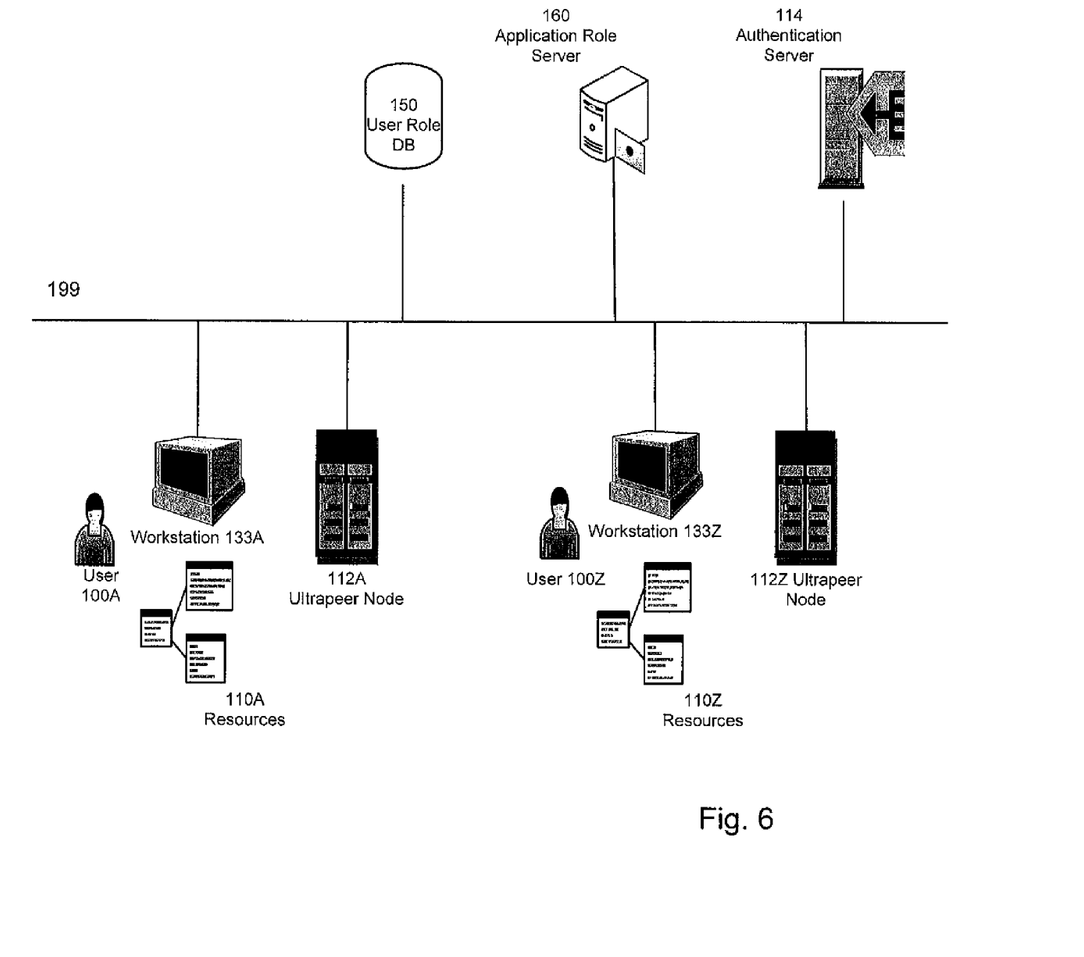
FIG. 6 illustrates an embodiment providing role-based access control in a peer-to-peer resource sharing community.

FIG. 6 illustrates an embodiment providing role-based access control in a peer-to-peer resource sharing community.

The resource sharing community depicted in FIG. 6 can include a multitude of users 100A-100Z. Zero or more workstations 133A-133Z can be owned or controlled by a user. A workstation can be, e.g., a personal computer (PC), or any other computing device capable of communicating with other computing devices over a network.

Workstations 133A-133Z can be interconnected via network 199. Network 199 can include zero or more LANs, zero or more WANs, zero or more VPNs, together with any packet switching and routing equipment necessary to establish the inter-network connectivity. In one embodiment, network 199 can be the Internet.

Zero or more computing resources 110A-110Z can be hosted by a workstation. Computing resources 110 can include files (e.g., video content files), network-accessible storage (e.g., disk arrays attached to storage area networks), web services, and software applications.

A user may wish to access computing resources hosted by workstations owned or controlled by another user member of the peer-to-peer resource sharing community.

The peer-to-peer resource sharing community can have at least one authentication server 114 storing the list of users belonging to the community. For each user, at least a unique user identifier (user ID) and authentication information can be stored. Authentication server 114A can employ a strong authentication mechanism known in the art such as X.509 certificate, Kerberos, or password-based authentication. Authentication server 114 can be implemented, e.g., as a Lightweight Directory Access Protocol (LDAP) server.

Each computing resource can have a set of permissions associated with it. In accordance with the role-based access control (RBAC) approach, permissions to access one or more resources can be associated with one or more roles, and one or more users can be assigned to one or more roles, thereby acquiring the roles' permissions. The assignment of users to roles can be stored in the centralized URA DB 150.

Each user member of the peer-to-peer resource sharing community can be associated with at least one ultrapeer node 112. Ultrapeer node 112 can manage the access to shareable computing resources hosted by workstations owned or controlled by the users associated with the ultrapeer node. Ultrapeer node 112 can maintain the list of the resources, including the authorization information for each of the resources. The authorization information for every resource can be stored in the form of Permission Role Assignment Table which for every resource stores one or more records comprising the following fields: resource identifier, role, and the access permitted.

One or more service levels can be associated with a computing resource (e.g., the resource availability). In order to establish the effective permission and/or the service level to a given resource for a particular user requesting the resource, the entity controlling access to the resource (e.g., ultrapeer node 112Z of FIG. 6) can select from the Permission Role Assignment Table the highest permission and/or the highest service level among the permissions and service levels corresponding to the roles to which the user is assigned.

Application Role Server (ARS) 160 can act as a central authoritative source of user identity and role assignment information. ARS 160 can issue LWPCs to users.

A skilled artisan would appreciate the fact that methods of providing role-based access control in a multi-organizational resource sharing community shown in FIGS. 4-5 and described herein supra can be applied for providing role-based access control in a peer-to-peer resource sharing community. In the descriptions of the methods, any reference to an ultrapeer node belonging to a user's organization should be substituted with a reference to an ultrapeer node with which the user is associated, and any reference to an authentication server belonging to the user's organization should be substituted with a reference to the authentication server belonging to the peer-to-peer resource sharing community.

Figure 7:
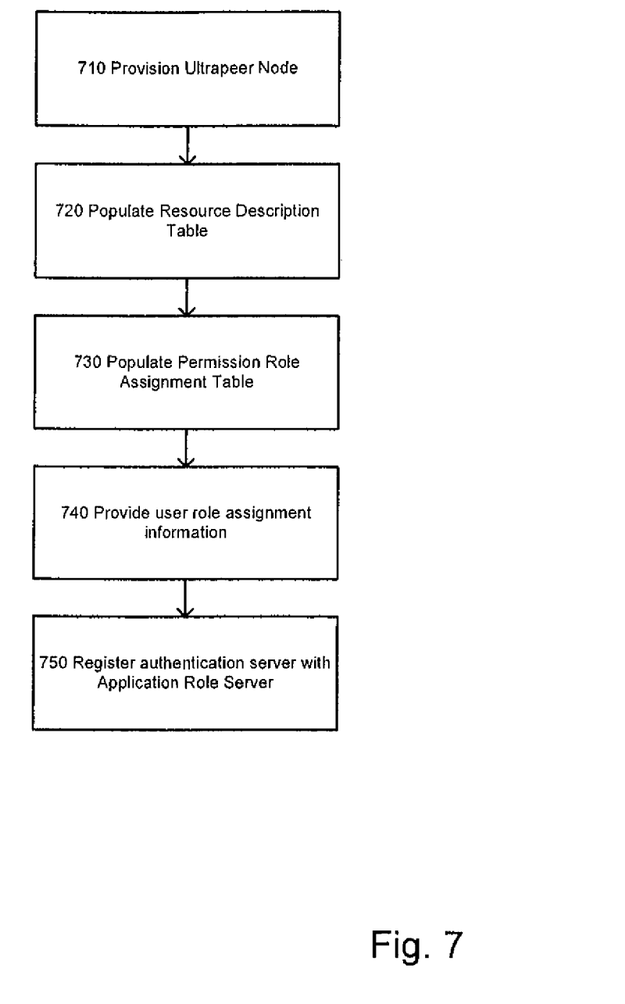
FIG. 7 illustrates a flow diagram of a sample implementation of a method of enabling a new organization to join a multi-organizational resource sharing community.

FIG. 7 illustrates a flow diagram of a sample implementation of a method of enabling a new organization to join a multi-organizational resource sharing community.

At step 710, at least one ultrapeer node is provisioned for the organization joining the in a multi-organizational resource sharing community. In one embodiment, the ultrapeer node software can run on one or more dedicated hardware servers. In another embodiment, the ultrapeer node software can be collocated with other software applications.

At step 720, Resource Description Table is populated with the description of the shareable computing resources access to which the ultrapeer node would control.

At step 730, Permission Role Assignment table is populated with the permission and service level information for the shareable computing resources.

At step 740, the user role assignment information is provided. In one embodiment, the assignment of users to roles can be stored in the centralized URA DB 150. In another embodiment, each organization's role structure can be mapped to the global role structure accepted in the multi-organizational community in accordance with a pre-defined mapping procedure. In yet another embodiment, the assignment of users to roles can be decentralized and stored by organizational authentication servers 114.

At step 750, one or more authentication servers belonging to the organization joining the multi-organizational resource sharing community are registered with the application role server 160 of FIG. 1. The registration can include one or more of the following steps: registering the name of the one or more authentication servers with the application role server; providing network connectivity by the application role server to the one or more authentication servers; and creating an account for the application role server at the one or more authentication servers where the one or more authentication servers require the requester to authenticate itself before the user authentication requests would be serviced.

The method terminates upon completing step 750.

A skilled artisan would appreciate the fact that in describing the embodiments of the present invention the term "user" refers to any entity wishing to consume a particular computing resource, including human computer operators and software programs.

A skilled artisan would also appreciate the fact that the network topologies shown in the drawings have been chosen for illustration purposes; any other network topologies providing the necessary connectivity between the components depicted in the drawings, are understood to be within the scope of this invention. A "network" can include zero or more LANs, zero or more WANs, zero or more VPNs, together with any packet switching and routing equipment necessary to establish the inter-network connectivity.

A small sample of systems methods and apparatus that are described herein is as follows:

A1. A method for controlling access to a plurality of computing resources in a distributed computing environment, said distributed computing environment including an application role server and a plurality of organizations, each organization including at least one access control node and at least one authentication server, said method comprising the steps of:

responsive to receiving a certificate request from a computing resource requester belonging to a first organization of said plurality of organizations, said application role server conditionally, upon successfully authenticating said computing resource requester by querying an authentication server belonging to said first organization, issuing a digital certificate to said computing resource requester; and responsive to a first access control node receiving a resource access request from said computing resource requester, said resource access request requesting access to a computing resource, said first access control node performing a step selected from the group consisting of: forwarding said resource access request to a second access control node; granting to said computing resource requester access to said computing resource upon ascertaining access privileges of said computing resource requester.

A2. The method of A1, wherein said resource access request includes said digital certificate.

A3. The method of A1, wherein said step of said first access control node granting access to said computing resource is performed conditionally, upon successfully authenticating said computing resource requester.

A4. The method of A1, wherein said step of granting access includes forwarding to said computing resource requester a resource access token selected from the group consisting of: a first short-living Universal Resource Locator (URL) for said computing resource; a second URL and an authorization token.

A5. The method of A1, wherein said step of granting access to said computing resource includes forwarding said computing resource to said computing resource requester.

A6. The method of A1, wherein said computing resource is selected from the group consisting of: a file, a software application, a web service, and a network-accessible storage.

A7. The method of A1, wherein said digital certificate includes role assignment information for said computing resource requester.

A8. The method of A1, wherein said digital certificate includes a computing resource requester authentication information selected from the group consisting of: a hashed password and an encrypted password.

A9. The method of A1, wherein said computing resource requester is provided by an entity selected from the group consisting of: a human computer operator and a software program.

A10. The method of A1, wherein said step of ascertaining access privileges includes querying a permission role assignment table, said permission role assignment table including at least one permission role assignment record specifying an access level corresponding to a combination of a resource identifier and a role.

B1. A method for controlling access to a plurality of computing resources in a distributed computing environment, said distributed computing environment including an application role server and a plurality of organizations, each organization including at least one access control node, said method comprising the steps of:

responsive to receiving a certificate request from a computing resource requester belonging to a first organization of said plurality of organizations, said application role server conditionally, upon successfully authenticating said computing resource requester, issuing a digital certificate to said computing resource requester; and responsive to a first access control node receiving a resource access request requesting access to a computing resource, said first access control node performing a step selected from the group consisting of: forwarding said resource access request to a second access control node; granting to said computing resource requester access to said computing resource upon ascertaining access privileges of said computing resource requester;
wherein said first access control node belongs to said first organization.

B2. The method of B1, wherein said resource access request includes said digital certificate.

B3. The method of B1, wherein said step of said first access control node granting access to said computing resource is performed conditionally, upon successfully authenticating said computing resource requester.

B4. The method of B1, wherein said step of granting access includes forwarding to said computing resource requester a resource access token selected from the group consisting of: a first short-living Universal Resource Locator (URL) for said computing resource; a second URL and an authorization token.

B5. The method of B1, wherein said step of granting access to said computing resource includes forwarding said computing resource to said computing resource requester.

B6. The method of B1, wherein said computing resource is selected from the group consisting of: a file, a software application, a web service, and a network-accessible storage.

B7. The method of B1, wherein said digital certificate includes role assignment information for said computing resource requester.

B8. The method of B1, wherein said digital certificate includes a computing resource requester authentication information selected from the group consisting of: a hashed password and an encrypted password.

B9. The method of B1, wherein said computing resource requester is provided by an entity selected from the group consisting of: a human computer operator and a software program.

B10. The method of B1, wherein said step of ascertaining access privileges includes querying a permission role assignment table, said permission role assignment table including at least one permission role assignment record specifying an access level corresponding to a combination of a resource identifier and a role.

C1. A method for controlling access to a plurality of computing resources in a distributed computing environment, said distributed computing environment including an application role server and a plurality of access control nodes, said method comprising the steps of:
responsive to receiving a certificate request from a computing resource requester, said application role server conditionally, upon successfully authenticating said computing resource requester, issuing a digital certificate to said computing resource requester;
responsive to receiving a resource search request by a first access control node, said first access control node conditionally, upon successfully authenticating said computing resource requester, performing resource search; and
responsive to said first access control node receiving a resource access request requesting access to a computing resource to said computing resource requester, said first access control node performing a step selected from the group consisting of: forwarding said resource access request to a second access control node; granting to said computing resource requester access to said computing resource upon ascertaining access privileges of said computing resource requester.

C2. The method of C1, wherein said resource access request includes said digital certificate.

C3. The method of C1, wherein said step of said first access control node granting access to said computing resource is performed conditionally, upon successfully authenticating said computing resource requester.

C4. The method of C1, wherein said step of granting access includes forwarding to said computing resource requester a resource access token selected from the group consisting of: a first short-living Universal Resource Locator (URL) for said computing resource; a second URL and an authorization token.

C5. The method of C1, wherein said step of granting access to said computing resource includes forwarding said computing resource to said computing resource requester.

C6. The method of C1, wherein said computing resource is selected from the group consisting of: a file, a software application, a web service, and a network-accessible storage.

C7. The method of C1, wherein said digital certificate includes a role assignment information for said computing resource requester.

C8. The method of C1, wherein said digital certificate includes a computing resource requester authentication information selected from the group consisting of: a hashed password and an encrypted password.

C9. The method of C1, wherein said computing resource requester is provided by an entity selected from the group consisting of: a human computer operator and a software program.

C10. The method of C1, wherein said step of ascertaining access privileges includes querying a permission role assignment table, said permission role assignment table including at least one permission role assignment record specifying an access level corresponding to a combination of a resource identifier and a role.

D1. A method for controlling access to a plurality of computing resources in a distributed computing environment, said distributed computing environment including an application role server and a plurality of access control nodes, said method comprising the steps of:
responsive to receiving a resource search request by a first access control node, said first access control node requesting role assignment information for said computing resource requester from said application role server;
responsive to receiving a role assignment information request, said application role server conditionally, upon successfully authenticating said computing resource requester, forwarding a role assignment information for said computing resource requester to said first access control node;
responsive to receiving by said first access control node said role assignment information from said application role server, said first access control node performing resource search; and
responsive to receiving by a first access control node a resource access request requesting access to a computing resource, said first access control node performing a step selected from the group consisting of: forwarding said resource access request to a second access control node; granting access to said computing resource to said computing resource requester upon ascertaining access privileges of said computing resource requester.

D2. The method of D1, wherein said resource access request includes a digital certificate.

D3. The method of D1, wherein said step of application role server forwarding role assignment information is followed by the step of: said first access control node forwarding said resource search request to one or more peer access control nodes.

D4. The method of D1, wherein said step of granting access includes forwarding to said computing resource requester a resource access token selected from the group consisting of: a first short-living Universal Resource Locator (URL) for said computing resource; a second URL and an authorization token.

D5. The method of D1, wherein said step of granting access to said computing resource includes forwarding said computing resource to said computing resource requester.

D6. The method of D1, wherein said computing resource is selected from the group consisting of: a file, a software application, a web service, and a network-accessible storage.

D7. The method of D1, wherein said distributed computing environment comprises a plurality of organizations; and wherein said first access control node and said computing resource requester belong to the same organization.

D8. The method of D1, wherein said computing resource requester is provided by an entity selected from the group consisting of: a human computer operator and a software program.

D9. The method of D1, wherein said step of ascertaining access privileges includes querying a permission role assignment table, said permission role assignment table including at least one permission role assignment record specifying an access level corresponding to a combination of a resource identifier and a role.

E1. A method for controlling access to a plurality of computing resources in a distributed computing environment, said distributed computing environment including an application role server and a plurality of organizations, each organization including at least one access control node, said method comprising the steps of:
responsive to a first access control node receiving a request to access a computing resource from a computing resource requester, said computing resource requester belonging to a first organization of said plurality of organizations, said first access control node requesting role assignment information for said computing resource requester from said application role server;
responsive to receiving a role assignment information request, said application role server conditionally, upon successfully authenticating said computing resource requester, forwarding role assignment information for said computing resource requester to said first access control node; and
responsive to said first access control node receiving said role assignment information from said application role server, said first access control node performing a step selected from the group consisting of: forwarding said resource access request to a second access control node; granting to said computing resource requester access to said computing resource requester upon ascertaining access privileges of said computing resource requester;
wherein said first access control node belongs to said first organization.

E2. The method of E1, wherein said resource access request includes a digital certificate.

E3. The method of E1, wherein said step of application role server forwarding role assignment information is followed by the step of: said first access control node forwarding said resource search request to one or more peer access control nodes.

E4. The method of E1, wherein said step of granting access includes forwarding to said computing resource requester a resource access token selected from the group consisting of: a first short-living Universal Resource Locator (URL) for said computing resource; a second URL and an authorization token.

E5. The method of E1, wherein said step of granting access to said computing resource includes forwarding said computing resource to said computing resource requester.

E6. The method of E1, wherein said computing resource is selected from the group consisting of: a file, a software application, a web service, and a network-accessible storage.

E7. The method of E1, wherein said distributed computing environment comprises a plurality of organizations; and wherein said first access control node and said computing resource requester belong to the same organization.

E8. The method of E1, wherein said computing resource requester is provided by an entity selected from the group consisting of: a human computer operator and a software program.

E9. The method of E1, wherein each organization of said plurality of organizations includes an authentication server; wherein said computing resource requester belongs to a first organization of said plurality of organizations; and
wherein said step of said application role server authenticating said computing resource requester is performed by querying an authentication server belonging to said first organization.

E10. The method of E1, wherein said step of ascertaining access privileges includes querying a permission role assignment table, said permission role assignment table including at least one permission role assignment record specifying an access level corresponding to a combination of a resource identifier and a role.

F1. A method of joining a multi-organizational resource sharing community by a joining organization, said resource sharing community comprising a plurality of organizations and an application role server, said joining organization having an organizational network interconnecting a plurality of computing resources and an authentication server, said method comprising the steps of:
provisioning at least one access control node for said joining organization;
providing user role assignment information for at least one computing resource requester associated with said joining organization; and
registering said authentication server with said application role server.

F2. The method of F1, wherein said user role assignment information includes at least one user role assignment record, said record assigning a role to a computing resource requester.

F3. The method of F1, wherein said step of provisioning at least one access control node includes providing a resource description table including a description of at least one computing resource controlled by said joining organization.

F4. The method of F1, wherein said step of provisioning at least one access control node includes providing a permission role assignment table including at least one permission role assignment record, said permission role assignment record specifying at least one of: an access permission corresponding to a combination of a computing resource identifier and a role, a service level corresponding to a combination of a computing resource identifier and a role F5. The method of F1, wherein said step of registering said authentication server is provided by at least one of: registering a name said authentication server with said application role server; providing network connectivity by said application role server to said authentication server; and creating an account for said application role server on said authentication server.

F6. The method of F1, wherein said computing resource requester is provided by an entity selected from the group consisting of: a human computer operator and a software program.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. A method for controlling access to a plurality of computing resources in a distributed computing environment, the distributed computing environment including an application role server and a plurality of organizations, each organization including at least one access control node and at least one computing resource, the method comprising:
responsive to receiving a certificate request from a computing resource requester belonging to a first organization of the plurality of organizations, the application role server conditionally, upon successfully authenticating the computing resource requester by querying an authentication server, issuing a digital certificate to the computing resource requester, wherein the digital certificate comprises computing resource requester identity information and role assignment information, to provide proof of identity and role assignment information for the computing resource to each organization represented in the plurality of computing resources in the distributed computing environment, wherein the at least one access control node of each organization separately authenticates the identity and role assignment information of the computing resource with the digital certificate before providing access to the at least one computing resource of the organization;
responsive to a first access control node belonging to the first organization receiving a resource access request from the computing resource requester, wherein the resource access request comprises the digital certificate, the resource access request requesting access to a computing resource belonging to a second organization, the first access control node forwarding the resource access request to a second access control node belonging the to the second organization, wherein the computing resource belonging to the second organization does not belong to the first organization, and wherein the second access control node identifies one or more computing resources belonging to the second organization that the computing resource requester is allowed to access, based upon ascertaining access privileges of the computing resource requester, wherein the ascertaining access privileges includes querying a permission role assignment table, the permission role assignment table including at least one permission role assignment record specifying an access level corresponding to a combination of a resource identifier and a role;
responsive to the second access control node identifying the one or more computing resources belonging to the second organization, providing, to the computing resource requester belonging to the first organization of the plurality of organizations, a prompt to choose a computing resource of the one or more resources belonging to the second organization, based on a resource description and parameters selected from the group consisting of: a service level, a resource usage price, and a resource access policy; and
based on obtaining the computing resource chosen, granting to the computing resource requester access to the computing resource chosen of the one or more resources belonging to the second organization.

2. The method of claim 1, wherein the first access control node granting access to the computing resource chosen of the one or more resources belonging to the second organization is performed conditionally, upon successfully authenticating the computing resource requester.

3. The method of claim 1, wherein the granting to the computing resource requester access includes forwarding to the computing resource requester a resource access token selected from the group consisting of: a first short-living Universal Resource Locator (URL) for the computing resource chosen of the one or more resources belonging to the second organization; a second URL and an authorization token.

4. The method of claim 1, wherein the granting to the computing resource requester access to the computing resource chosen of the one or more resources belonging to the second organization includes forwarding the computing resource chosen of the one or more resources belonging to the second organization to the computing resource requester.

5. The method of claim 1, wherein the computing resource chosen of the one or more resources belonging to the second organization is selected from the group consisting of: a file, a software application, a web service, and a network-accessible storage.

6. The method of claim 1, wherein the digital certificate includes role assignment information for the computing resource requester.

7. The method of claim 1, wherein the digital certificate includes a computing resource requester authentication information selected from the group consisting of: a hashed password and an encrypted password.

8. The method of claim 1, wherein the computing resource requester is provided by an entity selected from the group consisting of: a human computer operator and a software program.

9. The method of claim 1, further comprising:
receiving, by the computing resource requester, responsive to the forwarding or the granting, identifiers of computing resources belonging to the second organization meeting parameters in the resource access request for the computing resource, wherein the computing resource requester is authorized to access the identified computing resources belonging to the second organization.

10. A computer program product comprising:
a non-transitory computer readable storage medium readable by one or more processors in a distributed computing environment, and storing instructions for execution by the one or more processors for performing a method for controlling access to a plurality of computing resources in a distributed computing environment, the distributed computing environment including an application role server and a plurality of access control nodes, the method comprising:
responsive to receiving a certificate request from a computing resource requester belonging to a first organization of the plurality of organizations, the application role server conditionally, upon successfully authenticating the computing resource requester by querying an authentication server, issuing a digital certificate to the computing resource requester, wherein the digital certificate comprises computing resource requester identity information and role assignment information, to provide proof of identity and role assignment information for the computing resource to each organization represented in the plurality of computing resources in the distributed computing environment, wherein the at least one access control node of each organization separately authenticates the identity and role assignment information of the computing resource with the digital certificate before providing access to the at least one computing resource of the organization;

responsive to a first access control node belonging to the first organization receiving a resource access request from the computing resource requester, wherein the resource access request comprises the digital certificate, the resource access request requesting access to a computing resource belonging to a second organization, the first access control node forwarding the resource access request to a second access control node belonging the to the second organization, wherein the computing resource belonging to the second organization does not belong to the first organization, and wherein the second access control node identifies one or more computing resources belonging to the second organization that the computing resource requester is allowed to access, based upon ascertaining access privileges of the computing resource requester, wherein the ascertaining access privileges includes querying a permission role assignment table, the permission role assignment table including at least one permission role assignment record specifying an access level corresponding to a combination of a resource identifier and a role;

responsive to the second access control node identifying the one or more computing resources belonging to the second organization, providing, to the computing resource requester belonging to the first organization of the plurality of organizations, a prompt to choose a computing resource of the one or more resources belonging to the second organization, based on a resource description and parameters selected from the group consisting of: a service level, a resource usage price, and a resource access policy; and based on obtaining the computing resource chosen, granting to the computing resource requester access to the computing resource chosen of the one or more resources belonging to the second organization.

11. The computer program product of claim 10, wherein the first access control node granting access to the computing resource chosen of the one or more resources belonging to the second organization is performed conditionally, upon successfully authenticating the computing resource requester.

12. The computer program product of claim 10, wherein the granting to the computing resource requester access includes forwarding to the computing resource requester a resource access token selected from the group consisting of: a first short-living Universal Resource Locator (URL) for the computing resource chosen of the one or more resources belonging to the second organization; a second URL and an authorization token.

13. The computer program product of claim 10, wherein the granting to the computing resource requester access to the computing resource chosen of the one or more resources belonging to the second organization includes forwarding the computing resource chosen of the one or more resources belonging to the second organization to the computing resource requester.

14. The computer program product of claim 10, wherein the computing resource chosen of the one or more resources belonging to the second organization is selected from the group consisting of: a file, a software application, a web service, and a network-accessible storage.

15. The computer program product of claim 10 wherein the digital certificate includes role assignment information for the computing resource requester.

16. The computer program product of claim 10 wherein the digital certificate includes a computing resource requester authentication information selected from the group consisting of: a hashed password and an encrypted password.

17. The computer program product of claim 10 wherein the computing resource requester is provided by an entity selected from the group consisting of: a human computer operator and a software program.

18. A system comprising:
one or more memory;
one or more processors in communication with the memory; and
program instructions executable by the one or more processors in a distributed computed environment via the one or more memory to perform a method for controlling access to a plurality of computing resources in a distributed computing environment, said distributed computing environment including an application role server and a plurality of access control nodes, the method comprising:

responsive to receiving a certificate request from a computing resource requester belonging to a first organization of the plurality of organizations, the application role server conditionally, upon successfully authenticating the computing resource requester by querying an authentication server, issuing a digital certificate to the computing resource requester, wherein the digital certificate comprises computing resource requester identity information and role assignment information, to provide proof of identity and role assignment information for the computing resource to each organization represented in the plurality of computing resources in the distributed computing environment, wherein the at least one access control node of each organization separately authenticates the identity and role assignment information of the computing resource with the digital certificate before providing access to the at least one computing resource of the organization;

responsive to a first access control node belonging to the first organization receiving a resource access request from the computing resource requester, wherein the resource access request comprises the digital certificate, the resource access request requesting access to a computing resource belonging to a second organization, the first access control node forwarding the resource access request to a second access control node belonging the to the second organization, wherein the computing resource belonging to the second organization does not belong to the first organization, and wherein the second access control node identifies one or more computing resources belonging to the second organization that the computing resource requester is allowed to access, based upon ascertaining access privileges of the computing resource requester, wherein the ascertaining access privileges includes querying a permission role assignment table, the permission role assignment table including at least one permission role assignment record specifying an access level corresponding to a combination of a resource identifier and a role;

responsive to the second access control node identifying the one or more computing resources belonging to the second organization, providing, to the computing resource requester belonging to the first organization of the plurality of organizations, a prompt to choose a computing resource of the one or more resources belonging to the second organization, based on a resource description and parameters selected from the group consisting of: a service level, a resource usage price, and a resource access policy; and based on obtaining the computing resource chosen, granting to the computing resource requester access to the computing resource chosen of the one or more resources belonging to the second organization.

19. The system of claim 18, wherein the first access control node granting access to the computing resource chosen of the one or more resources belonging to the second organization is performed conditionally, upon successfully authenticating the computing resource requester.

20. The system of claim 18, wherein the granting to the computing resource requester access includes forwarding to the computing resource requester a resource access token selected from the group consisting of: a first short-living Universal Resource Locator (URL) for the computing resource chosen of the one or more resources belonging to the second organization; a second URL and an authorization token.

21. The system of claim 18, wherein the granting to the computing resource requester access to the computing resource chosen of the one or more resources belonging to the second organization includes forwarding the computing resource chosen of the one or more resources belonging to the second organization to the computing resource requester.

22. The system of claim 18, wherein the computing resource chosen of the one or more resources belonging to the second organization is selected from the group consisting of: a file, a software application, a web service, and a network-accessible storage.

23. The system of claim 18, wherein the digital certificate includes role assignment information for the computing resource requester.

24. The system of claim 18 wherein the computing resource requester is provided by an entity selected from the group consisting of: a human computer operator and a software program.

25. The system of claim 18, wherein the digital certificate includes a computing resource requester authentication information selected from the group consisting of: a hashed password and an encrypted password.

* * * * *